Feb. 3, 1953     J. KLUDT ET AL     2,627,108
APPARATUS FOR ASSEMBLING THREADED PARTS
Filed Feb. 19, 1949     4 Sheets-Sheet 2
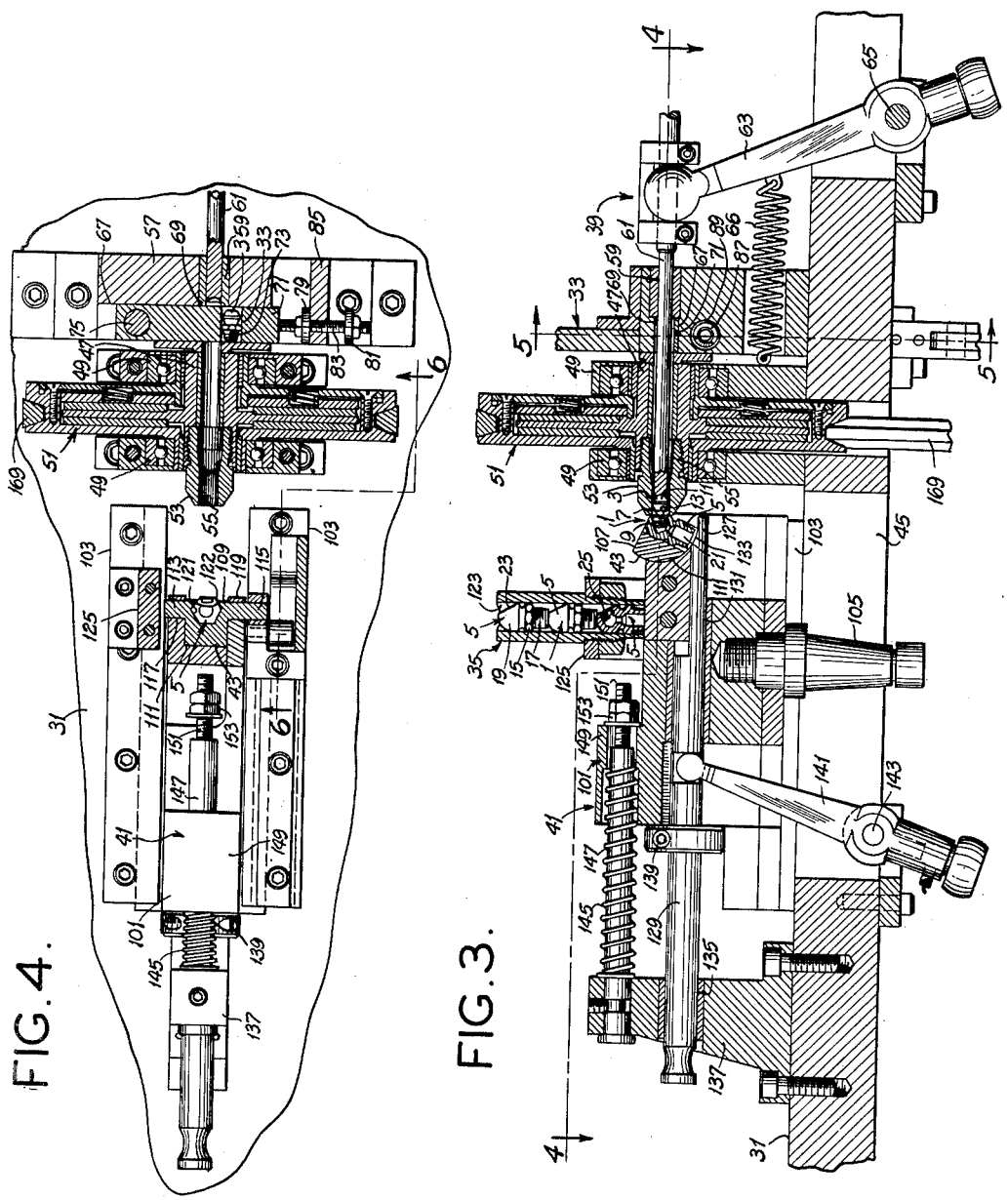
FIG. 4.
FIG. 3.

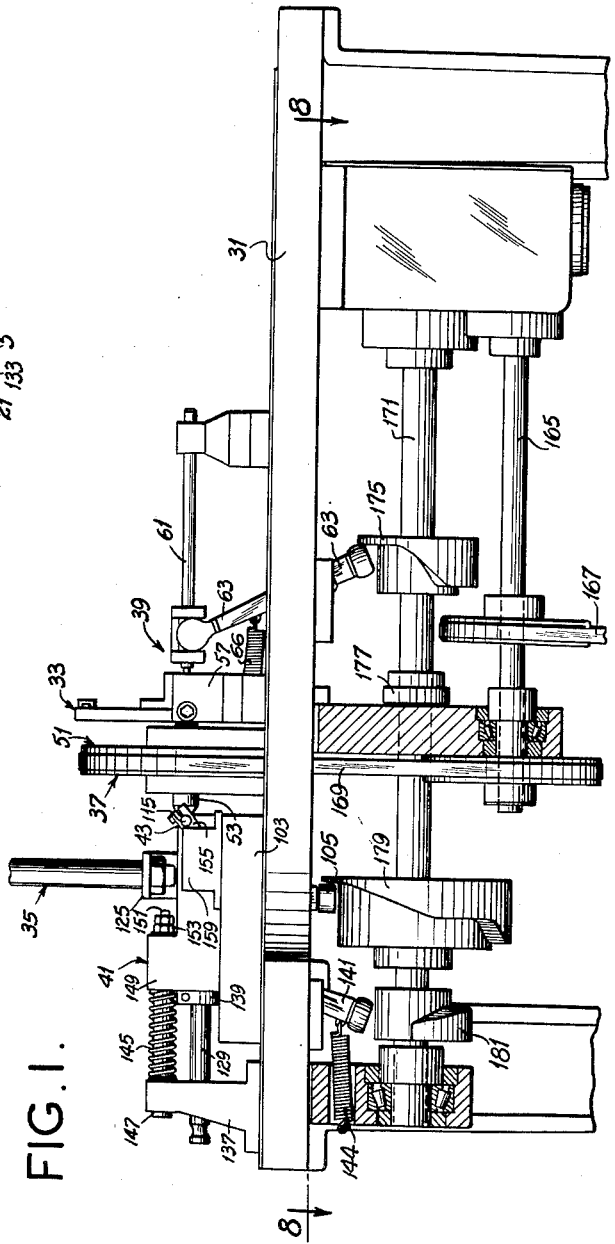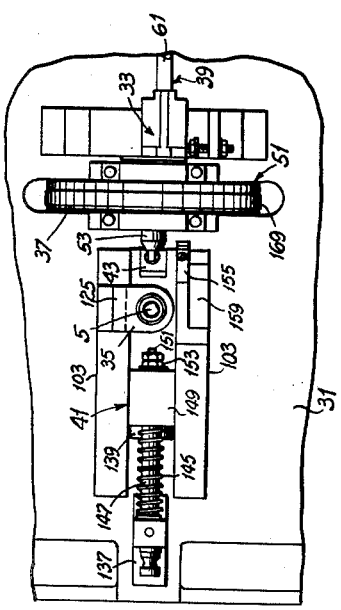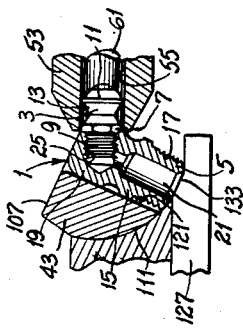

Feb. 3, 1953

J. KLUDT ET AL 2,627,108

APPARATUS FOR ASSEMBLING THREADED PARTS

Filed Feb. 19, 1949

Jonathan Kludt,
Howard Parks,
Inventors.
Haynes and Koenig
Attorneys.

Feb. 3, 1953 J. KLUDT ET AL 2,627,108
APPARATUS FOR ASSEMBLING THREADED PARTS
Filed Feb. 19, 1949 4 Sheets-Sheet 4
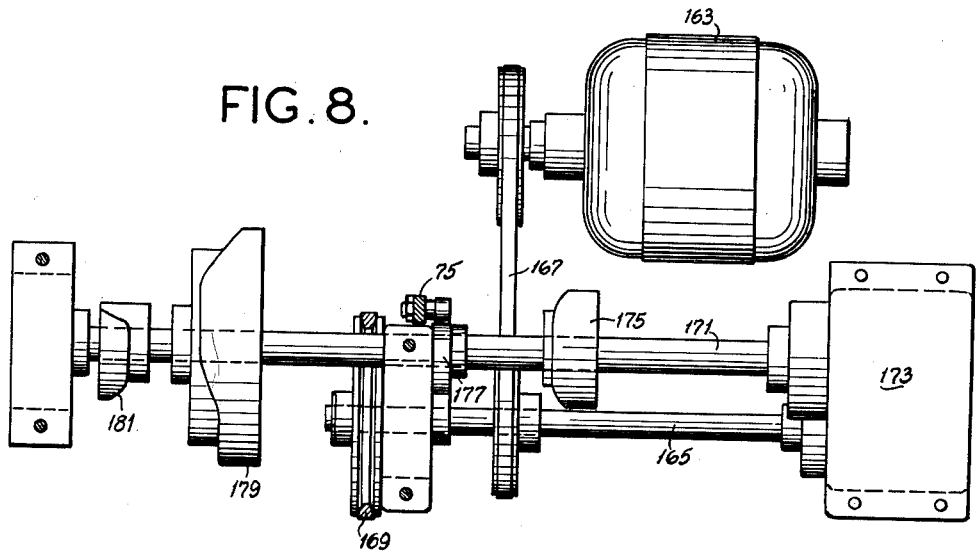
FIG. 8.
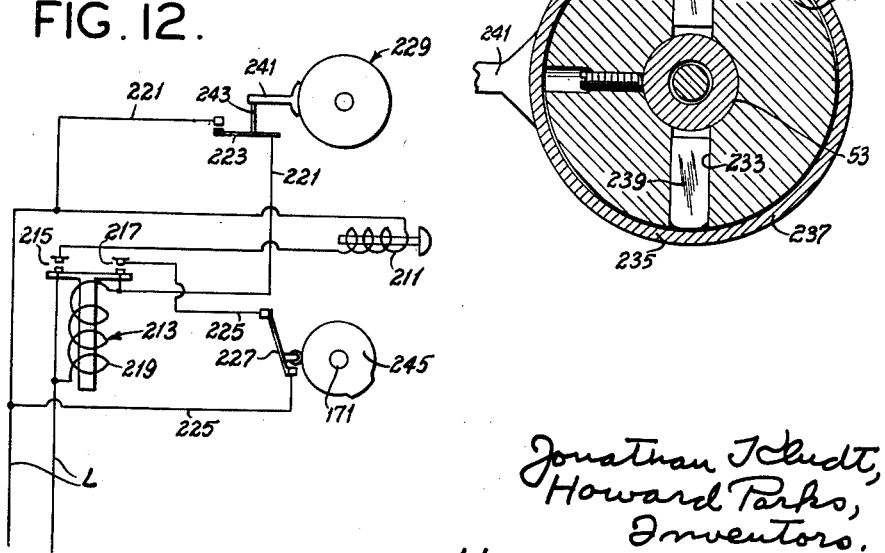
FIG. 11.
FIG. 12.
Jonathan Kludt,
Howard Parks,
Inventors.
Haynes and Koenig,
Attorneys.

Patented Feb. 3, 1953

2,627,108

UNITED STATES PATENT OFFICE 2,627,108

APPARATUS FOR ASSEMBLING THREADED PARTS

Jonathan Kludt, Overland, and Howard Parks, St. Louis, Mo., assignors to Lincoln Engineering Company, St. Louis, Mo., a corporation of Missouri Application February 19, 1949, Serial No. 77,432

2 Claims. (Cl. 29—211)

1

This invention relates to apparatus for assembling threaded parts, and, more particularly, to apparatus for assembling angled fittings such as are used in pressure lubrication systems to receive a coupler on the end of a lubricant hose.

Among the several objects of the invention may be noted the provision of apparatus for automatically assembling threaded parts, particularly for assembling lubricant-receiving fitting inserts with adaptors by threading; the provision of apparatus of the class described for threading an insert into an adaptor at an angle to the axis of the adaptor to provide an elbow fitting; and the provision of apparatus such as described which is reliable in operation and capable of high production. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a side elevation of the apparatus of this invention;

Fig. 2 is a fragmentary plan view of parts of Fig. 1;

Fig. 3 is a vertical longitudinal section illustrating parts in position at the completion of an assembling operation;

Fig. 4 is a horizontal section taken on line 4—4 of Fig. 3, illustrating parts in a different position;

Fig. 7 is an enlarged fragmentary detail of Fig. 3;

Fig. 8 is a horizontal section taken on line 8—8 of Fig. 1;

Fig. 11 is a section taken on line 11—11 of Fig. 10; and,

Fig. 12 is a wiring diagram for Fig. 9.

Similar reference characters indicate corresponding parts throughout the several views of the drawings.

2

Figure 6:
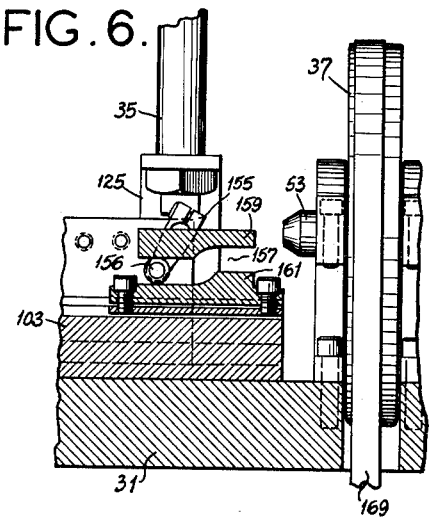
Fig. 6 is a vertical section taken on line 6—6 of Fig. 4.

The apparatus of this invention as herein disclosed is particularly adapted for automatically assembling elbow fittings such as are used in pressure lubrication systems to receive a coupler on the end of a lubricant hose. Such a fitting, completely assembled, is generally designated 1 in Figs. 3 and 7. It is shown to comprise a straight lubricant-receiving fitting insert 3, which is of the type shown in U. S. Patent 2,400,817, threaded into a straight adaptor 5. The insert 3 has a hexagonal portion 7 below which is an externally threaded stem 9 and above which is a generally hemispherical head 11. Between the head and the hexagonal portion, the insert has an annular peripheral groove 13. The adaptor 5 has a hexagonal portion 15 below which is an externally threaded stem 17 and above which is a head 19. A lubricant passage 21 extends through the stem 17 into the head 19. The latter has a beveled face 23 (Fig. 3) at an angle with respect to the axis of the adaptor. In the head 19 is a threaded socket 25 normal to the face 23 and leading through the head from the face to the passage 21. The stem 9 of the insert 3 is threaded in this socket so that the insert extends outward from the upper end of the adaptor at an angle of approximately 112½ degrees to the stem of the adaptor. Other angles may be employed, and as will appear, the machine is adaptable to accommodate fittings having such other angles.

In general, the apparatus of this invention for assembling the inserts with the adaptors comprises a support in the form of a table 31 on which is mounted a gravity-feed magazine 33 for inserts 3 and a gravity-feed magazine 35 for adaptors 5. At 37 is shown an insert driving mechanism for rotating an insert to thread it into the socket in an adaptor. Inserts from the insert magazine are fed one-by-one into the insert driving mechanism by a feeding mechanism 39. An adaptor positioning mechanism is generally designated 41. This includes an adaptor holder 43. The latter is moved between a retracted position for receiving an adaptor from the adaptor magazine and a forward position wherein it holds an adaptor to have an insert driven into the adaptor socket 25 by the insert driving mechanism. As the adaptor holder moves away from the insert driving mechanism, it carries away the assembled adaptor and insert and during this return movement the assembly is discharged and drops through an opening 45 in the table.

More particularly, the insert driving mechanism 37 comprises a hollow shaft 47 journalled for rotation on a horizontal axis above the table in bearing blocks 49. This shaft is adapted to be driven through a friction disc slip clutch 51. Fixed in the forward end of the shaft is a chuck or socket 53 having a splined axial passage 55 and constituting an insert-turning wrench. The arrangement is such that an insert may be fed forward through the shaft into the wrench 53, whereupon the insert is keyed by its hexagonal portion 7 within the splined passage 55 in the wrench to rotate with the wrench while being axially slidable therein.

Figure 5:
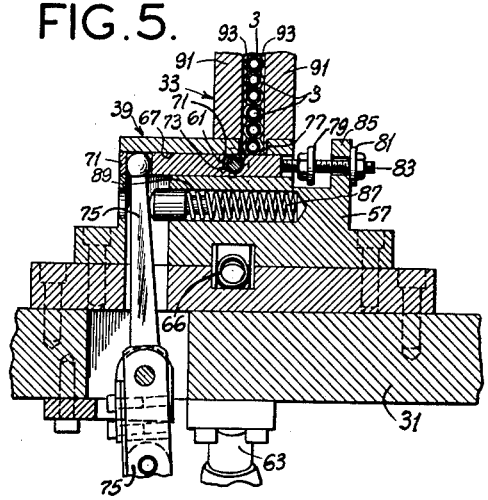
Fig. 5 is a vertical section taken on line 5—5 of Fig. 3.
Figure 9:
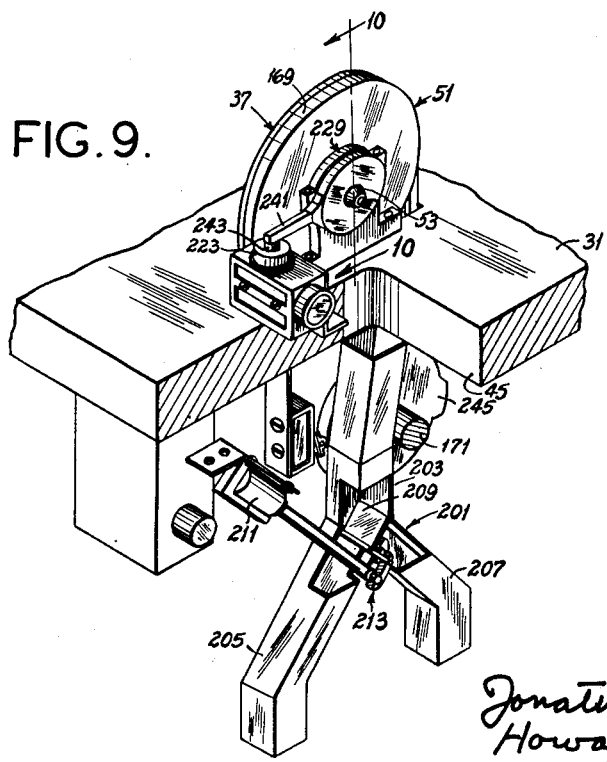
Fig. 9 is a perspective, with parts broken away and shown in section, of the apparatus of this invention as it is provided with means for separating proper assemblies from non-assembled parts.
Figure 10:
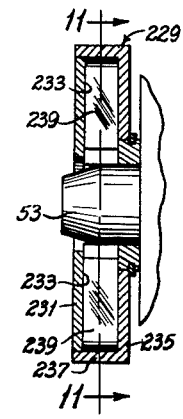
Fig. 10 is an enlarged section taken on line 10—10 of Fig. 9.

The mechanism 39 for feeding inserts from the insert magazine 33 to the insert driving mechanism 37 comprises a block 57 fixed on the table at the rearward end of the shaft 47. This block has a passage 59 aligned with the shaft. Reciprocating in this passage is a pusher rod 61 operable by a cam follower lever 63 pivoted to the table at 65. This lever is biased to drive the pusher rod forward by a spring 66. In the block 57 is a transverse transfer passage 67 which intersects the pusher rod passage 59 at 69. Reciprocating in the transfer passage 67 is a slide 71 having an upwardly opening insert-receiving notch or seat 73. The slide 71 is reciprocated by a cam follower lever 75 between an insert-receiving position (Fig. 4) wherein the notch 73 is aligned with a vertical passage 77 leading through the top of the block 57 into the transfer passage 67, and an insert-delivering position (Figs. 3 and 5 wherein the notch 73 is aligned with the pusher rod passage 59. These positions are determined by the engagement of spaced stop nuts 79 and 81 threaded on a rod 83 extending from the slide with an upwardly extending lug portion 85 of the block 57. The slide is biased toward its insert-delivering position by a compression spring 87 located in a spring passage 89 in the block 57 and reacting from the end of the passage against the cam follower lever 75.

The insert magazine 33 comprises a pair of guides 91 extending upward from the block 57 on opposite sides of the vertical insert passage 77. These guides have opposed narrow ribs 93 adapted loosely to engage in the annular peripheral grooves 13 of the inserts. At their lower ends the ribs extend into the passage 77 and terminate above the transfer passage 67. The arrangement is such that inserts 3 may be slidably stacked up in the magazine with the stems 9 of the inserts all directed toward the insert driving mechanism 37. The inserts may be stacked in the magazine by hand, or by a suitable device (not shown) for automatically delivering inserts in proper wrench-facing position from a supply hopper full of inserts. Such a device is not illustrated as it does not form a part of the invention.

The adaptor positioning mechanism 41 comprises a carriage 101 mounted for reciprocation toward and away from the wrench 53 in line with the latter on horizontal ways 103 fixed upon the top of the table. The carriage has a cam follower 105 extending downward through the opening 45 in the table. The adaptor holder 43 is pivotally mounted on the carriage for swinging movement about a transverse horizontal axis at the end of the carriage toward the wrench. The adaptor holder is formed to have an upper flat face 107, a forward flat face 109 (Fig. 4) generally perpendicular to its upper face, and an arcuate face 111. Extending outward from the sides of the holder are trunnions 113 and 115. The arcuate face is formed on an arc centered in the axis of the trunnions, which are journalled on the carriage as indicated at 117 and 119. The adaptor holder is formed with an adaptor-receiving recess 121 of partial hexagonal cross-section corresponding to part of the cross-section of the hexagonal portion 15 of the adaptors. This passage extends radially all the way through the holder from its upper face to its arcuate face 111, and opens through the forward face of the adaptor holder at a slot 122.

The adaptor magazine comprises a vertical tube having a hexagon-shaped passage 123 slidably accommodating a stack of adaptors. The tube is carried by a bracket 125 with its lower end located to be directly above the upper end of the recess 121 in the adaptor holder when the carriage 101 is moved away from the wrench 53 to the retracted position of Fig. 4 and the adaptor holder is in adaptor-receiving position with its upper face 107 horizontal and recess 121 vertical. The arrangement is such that the magazine 35 may be loaded with adaptors with their stems 17 directed downward and with their sockets 25 inclined upward in the direction toward the insert driving mechanism 37. The stack is held up in the magazine by the upper carriage surface when the carriage is out of retracted position. When the carriage is moved to its retracted position, the lowermost adaptor drops into the recess 121 in the adaptor holder and the stack drops downward in the magazine.

At 127 is shown a gate for closing the lower end of the recess 121 to hold an adaptor therein. This gate is formed at the forward end of a rod 129 mounted for reciprocation in a longitudinal passage 131 in the carriage. It has an arcuate surface 133 at its forward end mated with the arcuate surface 111 of the adaptor holder. The rod 129 extends rearward from the carriage and is slidable in a guide passage 135 in a bearing pedestal 137 mounted on the table. Fixed on the rod rearward of the carriage is a collar 139. The rod is actuated by a cam follower lever 141 extending downward through the opening 45 in the table and pivoted to the table at 143. It is biased toward the wrench by a spring 144 (Fig. 1). The carriage is biased toward the wrench by a compression spring 145 reacting from pedestal 137 against the carriage. The spring surrounds a rod 147 fixed in the pedestal and extending through an upwardly projecting portion 149 of the carriage. The rod has a threaded extension 151 carrying a stop nut 153 engageable by the forward face of 149 to determine the advanced forward position of the carriage and adaptor holder illustrated in Fig. 3.

Fixed on the outer end of the trunnion 115 of the adaptor holder, and extending downward from the trunnion, is a cam follower lever 155 (Figs. 1 and 6). At its lower end, this lever has a roller 156 which rides in a cam slot 157 defined by a pair of cam plates 159 and 161 fixed to the table. The cam slot is so shaped that as the carriage advances from its retracted position toward the wrench 53, the adaptor holder is swung to a tilted position wherein the socket 25 in an adaptor carried by the holder is axially aligned with the wrench (Fig. 3), and as the carriage is retracted, the adaptor holder swings back to adaptor-receiving position wherein the recess 121 is vertical (Fig. 4).

Mounted under the table is a motor 163. This drives a shaft 165 journalled under the table through a belt and pulley drive 167. Shaft 165 drives the driving member of the friction clutch 51 through a belt and pulley drive 169. It also drives a cam shaft 171 through a speed reducer 173. The cam shaft extends under the table in position for cams 175, 177, 179 and 181 thereon to actuate the followers 63, 75, 105 and 141 respectively. All these followers are spring-loaded, being biased toward the associated cams by the springs 66, 87, 145 and 144, respectively.

Operation is as follows:

The insert magazine 33 is loaded with inserts 3 and the adaptor magazine 35 is loaded with adaptors 5 in the manner described. The motor 163 is energized to drive the wrench 53 through the slip clutch 51 and to drive the cam shaft. The cam 175 actuates follower 63 to reciprocate the pusher rod 61 between a retracted position wherein the rod is retracted clear of the insert transfer passage 67 and an advanced position wherein the rod extends into the wrench 53. The cam 177 actuates the follower 75 to reciprocate the slide 71. The cams 175 and 177 are so developed and phased that the pusher rod 61 is retracted clear of the transfer passage 67 when the slide 71 is moved to insert-receiving position (Fig. 4) wherein the lowermost insert may drop out of the insert magazine into the transfer passage, the insert being received in the notch 73 in the slide. Then, when the slide moves to insert-delivering position (Fig. 5) wherein the notch 73 is aligned with the pusher rod passage 59, the pusher rod drives the insert through passage 59, the hollow shaft 47 and into the forward end of the wrench 53. Thereupon, the insert rotates with the wrench and is pushed toward the forward end of the wrench by the pusher rod under the action of the spring 66.

When the slide 71 is in insert-receiving position and the pusher rod 61 is retracted, the cam 179 holds the carriage in its retracted position wherein the adaptor holder 43 is in adaptor-receiving position (Fig. 4), i. e., with the upper face 107 of the holder horizontal and the recess 121 in the holder vertically aligned with the adaptor magazine. The lowermost adaptor drops out of the magazine and falls into the recess in the holder. The gate 127 at this time is in position closing the lower end of the slot, rod 129 being retracted along with the carriage because of the engagement of the rearward end of the carriage with the collar 139 on the rod.

As the insert is pushed through the wrench 53 by the pusher rod 61, the cam 179 releases the carriage so that the latter is moved forward toward the wrench by the spring 145. As the carriage moves forward, the adaptor holder is tilted forward by the action of the roller 156 on the lever 155 in the cam slot 157, to bring the socket 25 in the adaptor in the holder into alignment with the insert protruding from the wrench. The insert, which is turning, is thereupon threaded home in the socket. When it is fully driven, and can no longer rotate in the socket, the wrench stops turning, this being permitted by slipping in the friction clutch 51.

After the insert has been driven, the pusher rod 61 is retracted by cam 175 and the slide 71 moves back to insert-receiving position to take another insert from the insert magazine 33. The cam 179 meanwhile drives the carriage back to retracted position moving the adaptor holder back to adaptor-receiving position to take another adaptor from the adaptor magazine. As the carriage is retracted, the cam 181 drives the rod 129 in the direction away from the wrench at a more rapid rate than the rate of retraction of the carriage so that the gate 127 is withdrawn from beneath the recess 121 in the adaptor holder, and the adaptor-insert assembly drops out of the holder and falls through the opening 45 in the table into a suitable receiver under the table.

It sometimes happens that the apparatus will not make an assembly due, for example, to occasional faulty adaptors or inserts, or to missing of delivery of an adaptor or insert. If desired, the apparatus may be provided with the mechanism illustrated in Figs. 9-12 for automatically separating properly assembled fittings from unassembled parts which drop through the opening 45 in the table when no assembly is made. As shown, this separating mechanism comprises a chute 201 of inverted Y-shape, having an upper vertical section 203 and lower divergent branch sections 205 and 207. The chute is mounted under the table with the upper end of its vertical section located so that assembled fittings and/or unassembled parts will drop through the opening 45 into the chute. Within the chute is a swinging gate 209 adapted to swing between a first position wherein branch section 207 is blocked off and branch section 205 is open to the vertical section, and a second position wherein branch 205 is blocked off and branch 207 is open to the vertical section. The gate is controlled by a solenoid 211, the solenoid plunger being coupled to the gate by a linkage generally designated 213. When the solenoid is deenergized, the gate is maintained in its first position. When the solenoid is energized, the solenoid plunger swings the gate to its second position.

The solenoid 211 is connected in a power line L (Fig. 12) under control of a relay 213 having a set of contacts 215 adapted to make and break the solenoid circuit, a set of contacts 217 adapted to make and break a relay holding circuit, and a coil 219. The coil is connected across the power line L in a primary circuit 221 including a switch 223. The coil is also connected across the power line L in a holding circuit 225 including the relay contacts 217 and a cam-operated switch 227.

The switch 223 is controlled by a centrifugal governor, generally designated 229, mounted on the wrench 53. The governor comprises a disc 231 (Figs. 10 and 11) fixed on the wrench for rotation therewith and having radial slots 233 which open outward at the periphery of the disc. Assembled with the disc in such manner as to be rotary with respect to the disc is a cup-shaped member 235 having a peripheral flange 237 surrounding the disc. Radially slidable in the slots 233 in the disc are weights 239. These are retained in the slots by the member 235. The latter has a radial arm 241 extending outward from its peripheral flange 237 for controlling the switch 223, which is mounted on the table with its operating button 243 under the outer end of the arm.

The arrangement is such that, when the wrench 53 is rotating (which rotation is counterclockwise as viewed in Fig. 9, for insert-driving purposes), the weights 239 are thrown to the outer ends of slots 233, and, frictionally engaging the flange 237 of member 235, exert counterclockwise torque on this member and the arm 241. The latter accordingly presses down on the button 243 of switch 223 and holds the switch open against the inherent bias of the switch to close. Whenever the wrench stops rotating, no substantial frictional torque is exerted on the member 235 and the switch closes.

The switch 227 is controlled by a cam 245 fixed on the cam shaft 171. Switch 227 is normally biased closed. The cam 245 is so developed and phased that the switch remains closed for the major part of a revolution of the cam shaft and is opened by the cam just after the gate 127 is opened to discharge an adaptor from the adaptor holder.

Operation of the separating mechanism is as follows:

Assuming that the assembling apparatus has made a proper assembly, i. e., an insert 3 has been properly threaded home in an adaptor 5, when the insert has been driven into the adaptor as far as it will go, the insert can no longer rotate and the wrench 53 will stop rotating until the insert is moved out of the wrench. This causes the switch 223 to close, as above described. With switch 223 closed, the primary relay coil circuit 221 is completed and relay contacts 215 and 217 close. With contacts 215 closed, the solenoid circuit is completed, the solenoid is energized, and the gate 209 is swung to its second position wherein branch 205 is blocked off and branch 207 is open. When the adaptor holder 43 moves away from the wrench, the insert is removed from the wrench and the latter again rotates. This opens the switch 223 and breaks the circuit 221, but the relay coil remains energized to hold contacts 215 and 217 closed through the holding circuit 225 (switch 227 being closed) until the adaptor-insert assembly has dropped out of the adaptor holder and fallen through the vertical chute section 203 and branch 207 into a container (not shown) for completed fittings. Thereupon, the cam 245 (which is timed for the purpose) opens the switch 227, breaking the holding circuit, deenergizing the relay coil and opening the relay contacts 215 and 217.

Assuming that no assembly is made, as for example when an insert in the wrench is faulty and cannot be driven into an adaptor in the adaptor holder, the wrench does not stop rotating since the insert is not driven home in the adaptor. Consequently, the switch 223 does not close. Under these circumstances, the relay coil 219 is not energized, and the solenoid is not energized. The gate 209 therefore remains in its first position, blocking off chute section 207. When the adaptor holder moves away from the wrench, the insert is pushed out of the wrench, the adaptor drops out of the adaptor, and these parts drop through the vertical chute section 203 and branch 205 into a container (not shown) for rejected, unassembled inserts and adaptors.

While the invention as herein illustrated is particularly adapted for the assembly of the illustrated inserts and adaptors, it will be understood that the essential principles of the invention are applicable generally to assembling threaded parts other than lubrication fitting parts and to parts at other angles than the angle shown.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. In an assembling apparatus, a generally vertical gravity-feed magazine for holding a stack of parts, said magazine being open at its lower end, a carriage movable generally horizontally under the magazine, a part holder pivoted on the carriage to rock about a generally horizontal axis transverse to the direction of movement of the carriage, said holder having a part-receiving recess open at its top, bottom and forward faces, mechanism for moving the carriage between a retracted position wherein the recess in the holder is under the lower end of the magazine and an advanced position away from the magazine, mechanism for rocking the holder to position it with the recess vertical when the carriage is retracted and with the recess tilted when the carriage is advanced, and means movable with the carriage for closing the lower end of the recess when the carriage is retracted and as it moves to advanced position and movable relative to the carriage to open the lower end of the recess as the carriage is retracted.

2. In an assembling apparatus as set forth in claim 1, said mechanism for rocking the holder comprising a cam fixed with respect to the holder and carriage and a cam follower carried by the holder operable by said cam, and said means for opening and closing the lower end of the recess comprising a gate slidable in the carriage under the lower end of the recess and mechanism for sliding the gate away from under the recess as the carriage is retracted.

JONATHAN KLUDT.
HOWARD PARKS.

REFERENCES CITED

The following references are of record in the file of this patent:

UNITED STATES PATENTS

| Number | Name | Date |
| --- | --- | --- |
| 323,180 | Mason | July 28, 1885 |
| 1,302,280 | Batchelder | Apr. 29, 1919 |
| 1,345,619 | Moomy | July 6, 1920 |
| 1,431,493 | Thomas | Oct. 10, 1922 |
| 1,486,664 | Hires | Mar. 11, 1924 |
| 1,507,654 | Allison | Sept. 9, 1924 |
| 1,737,876 | Crosby et al. | Dec. 3, 1929 |
| 1,832,165 | Wilcox | Nov. 17, 1931 |
| 1,904,493 | Mathias | Apr. 18, 1933 |
| 1,921,989 | Green | Aug. 8, 1933 |
| 2,053,137 | Donovan et al. | Sept. 1, 1936 |
| 2,356,203 | Birdsall | Aug. 22, 1944 |
| 2,382,168 | Oxley et al. | Aug. 14, 1945 |
| 2,433,959 | Runkle | Jan. 6, 1948 |